March 31, 1953     W. R. CHANDLER ET AL     2,633,520
SWITCH MOUNT
Filed May 28, 1949
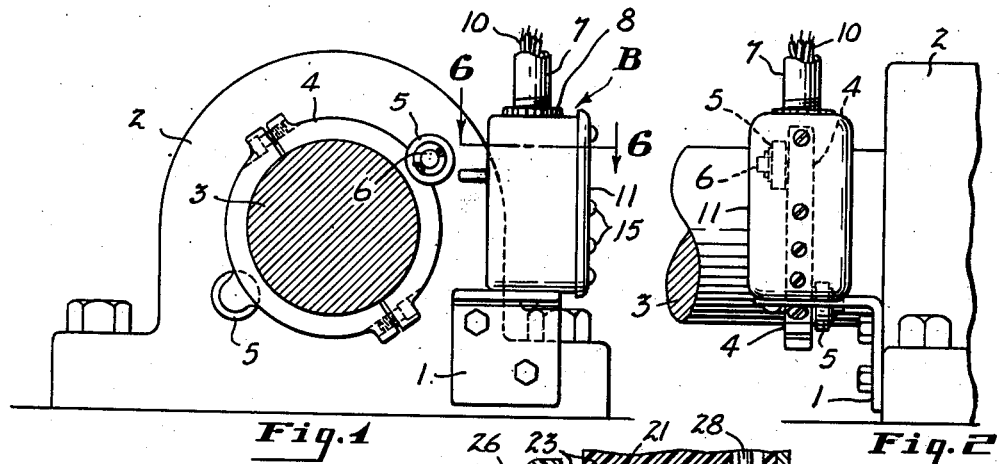
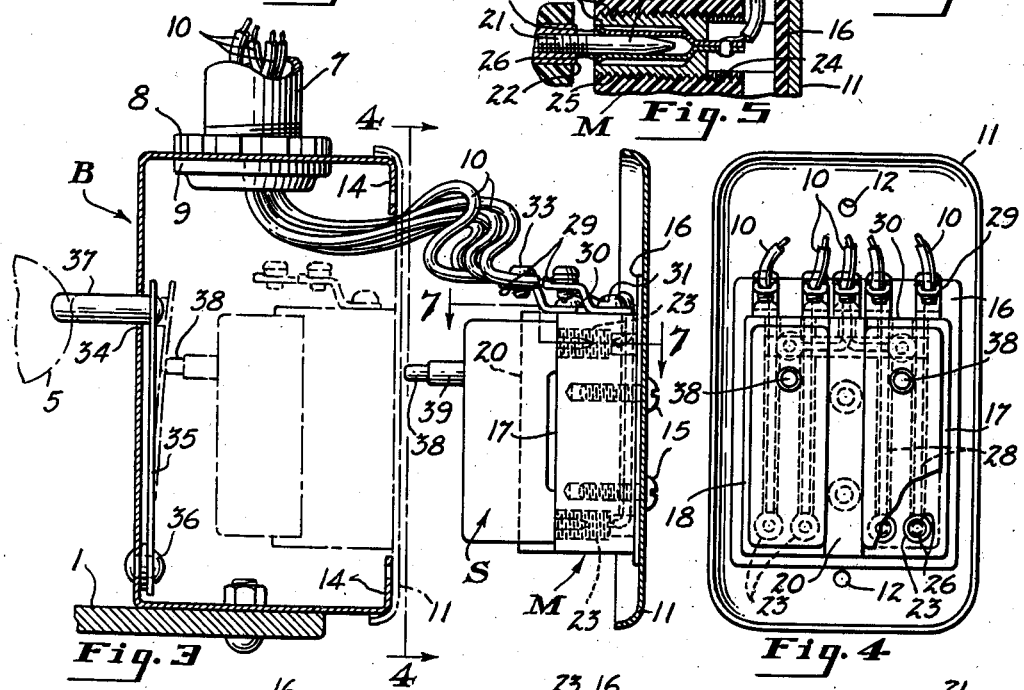
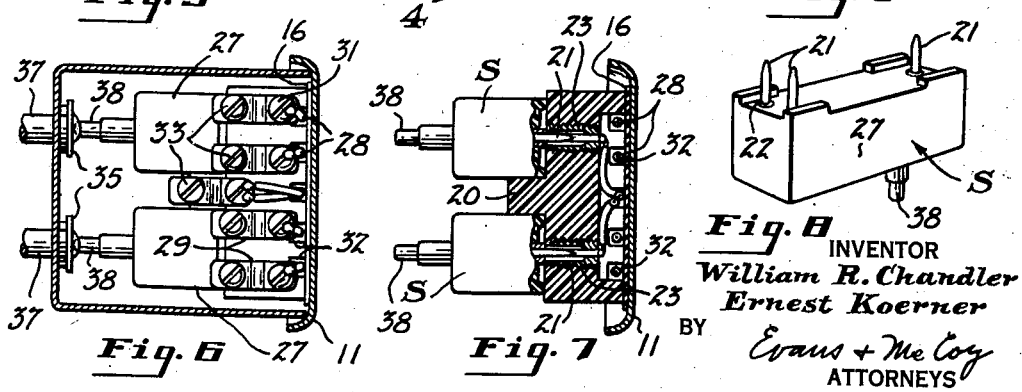
INVENTOR
William R. Chandler
Ernest Koerner
BY Evans + McCoy
ATTORNEYS Patented Mar. 31, 1953

2,633,520

UNITED STATES PATENT OFFICE 2,633,520

SWITCH MOUNT

William R. Chandler and Ernest Koerner, Akron, Ohio, assignors to The General Tire and Rubber Company, Akron, Ohio, a corporation of Ohio Application May 28, 1949, Serial No. 95,940

12 Claims. (Cl. 200—168)

This invention relates to mounts for electrical switches more particularly to switch and mount combinations arranged for facile removal and replacement of the switch element in control circuits.

In the control of electrically driven machines it is customary to employ limit switches which are actuated by machine movement. Much use is made of enclosed switch units commonly referred to as microswitches. It is necessary, from time to time, to inspect, repair, and replace such switches. Because of the locations of the limit switches on the machines, their relative inaccessibility and the danger and inconvenience to the service man incident to removal and replacement of the switches, it is desirable to provide a mounting arrangement which permits the switches to be quickly and easily removed and replaced.

It is therefore one of the principal objects of the invention to provide a switch mount or assembly of the character mentioned in which the switch is easily removed and replaced on the mount and which is relatively simple in design and construction and inexpensive to manufacture.

Among the advantageous features incorporated in the present switch and mount combination are the following: a wiring box to enclose the switch; the box carrying a projecting actuating member which operates the switch while the latter is protectively housed in the box; a mounting arrangement in which the switch is carried by the box cover for removal from the box when the cover is withdrawn, the cover and box cooperating to locate the switch in predetermined position within the box so as to be actuable by the actuating member permanently mounted in the box; an insulating body for supporting the switch, the switch and insulating body having separable contact elements which locate the switch on the body and the body contacts being electrically connected to terminals also carried by the insulating body, so that the mounted switch can be connected into the desired electrical circuit.

As a preferential arrangement, the separable switch mounting contacts are of the friction or slide type such as sockets embedded in the body and prongs projecting from the switch or vice versa so that they serve not only to provide electrical connections between the parts but also to locate the switch on the mount body and to secure the switch in place. As a further refinement the mounting body is formed with a plurality of mounting surfaces, preferably coplanar, for receiving a number of switches. In such a multiple switch assembly it is advantageous to form the mounting body with integral upstanding ribs that separate adjacent mounting surfaces and locate the switches on the mount body.

Other objects and advantages relating to novel combinations and arrangements of parts will become apparent from the following detailed description of the invention made in connection with the accompanying drawings forming a part of the specification and in which like parts throughout the several views are indicated by the same letters and numerals of reference.

In the drawings:

Figure 1 is a view showing the present switch mount in side elevation, the wiring box being supported adjacent a rotatable machine shaft and the shaft being shown in section;

Fig. 2 is a front elevational view of the switch mount and related structure of Fig. 1, parts being broken away and removed;

Fig. 3 is a vertical sectional view through the switch mounting box, this view being enlarged with respect to the preceding figures, the full lines showing the cover and the pair of switches carried thereby withdrawn from the box and the broken lines showing the cover in place on the box and the switches in normal or operating position within the box;

Fig. 4 is an elevational view, with parts broken away and removed, of the switches and the box cover which supports the switches, this view being taken substantially along the line indicated at 4—4 of Fig. 3;

Fig. 5 is a fragmentary enlarged sectional detail showing the sliding contact elements that secure the switches in place on the insulating body;

Fig. 6 is a sectional view through the upper portion of the box and the cover, with parts removed, this view being taken substantially along the line indicated at 6—6 of Fig. 1 and showing the switches and insulating mount body in plan;

Fig. 7 is a view partly in section and with parts removed, taken substantially along the line indicated at 7—7 of Fig. 3; and Fig. 8 is a perspective view of a suitable switch unit used in the present switch mount assembly to show the location and arrangement of the sliding contact and support prongs.

The switch mount assembly includes a box B which may be of stamped metal construction. This box is suitably supported as by being secured to an angle bracket 1 bolted to a journal or bearing 2 of an electrically operated machine. The machine has a shaft 3 rotatably supported by the journal 2 and carrying a split ring 4 on which projecting cam rollers 5 are rotatably mounted.

These rollers actuate the switches in the box B during rotation of the shaft, as will later appear. The two halves of the split ring 4 are secured together as by recessed cap screws so that the split ring can be applied about the shaft in any desired location or easily removed for repair or replacement. The cam rollers 5 are received on axial pins projecting from radial ears formed on the split ring halves, one of the pins being indicated at 6.

The upper wall of the box B is apertured to receive the end of a rigid metal tubular conduit 7 secured to the box as by nut 8 and collar 9. Electrical wires 10 extend into the interior of the box B through the conduit 7, these wires being connected to the electrical remote control devices that govern the machine in accordance with conventional practice.

The box B is formed with an open side which is normally closed by a matching stamped metal cover 11 secured in place as by screws (not shown) received through openings 12 in the cover and threaded into ears 14 integrally formed on the top and bottom walls of the box. A switch mounting body M of insulating material is secured to the inside of the box cover 11 as by screws 15. This mount body is formed of a suitable relatively hard, shape retaining plastic material such as cellulose acetate, methyl methacrylate or phenol formaldehyde resin. A sheet of insulating material indicated at 16 is interposed between the mount body and the inside face of the cover 11 to prevent contact between the conductors carried by the mount body and the metal of the cover as will later appear. This insulating sheet is formed of a suitable plastic, rubber or fiber.

The mounting block or body M is formed with substantially flat faces 17 and 18 which are preferably coplanar and which parallel the plane of the cover 11. Against these faces are mounted switch units S which may be of the conventional microswitch type modified with respect to contacts as later described. These switches are disposed in side by side parallel relation with their bases against the faces 17 and 18 of the mounting body M. An integral upstanding rib 20 is formed on the face of the mount body and extends the full length thereof. This rib separates the switches S, the latter being disposed with their sides flatwise against the rib so as to be located thereby in assembling the switches on the mount body.

The switches S are fitted with pins or contact prongs 21 which are threaded into metal sockets 22 embedded in insulating bodies 27 of the switches. The sockets 22 are electrically connected internally of the switch bodies to the operating components of the switches, the switches illustrated being conventional two-way single pole switches.

Within the mounting body M are embedded contact sockets which open through the mounting faces 17 and 18 and are positioned for alignment with the contact pins 21 of the switches S. The contact sockets comprise metal tubes 23 recessed in the body M as by being screwed into threaded bores 24 formed in the body and frictionally held in place. For this purpose the sockets 23 are formed with external threads, although the insulating mounting body may alternatively be molded about the metal sockets to embed the latter and to secure the sockets in the desired locations.

Within the interior of each of the socket tubes 23 are slide contacts 26 of resilient spring metal such as beryllium copper. These contacts cooperate to resiliently grip the switch contact prongs 21 as the latter are inserted into the sockets, the outer ends of the slide contacts being angularly disposed to provide flared or bell shaped openings at the mouths of the sockets in the planes of the mouth faces 17 and 18.

At the bottom of each of the socket tubes 23 the spring contacts 26 are brought together and passed with a press fit through a reduced opening in the base of the socket tube. The projecting ends of the spring contacts 26 are connected by electrical wires or conductors 28 to terminals 29 secured on upper end face 30 of the mounting body M as by screws 21. Recesses or channels 32 are formed as by cutting or molding in the mount body M to accommodate the conductor wires 28. These channels open through the face of the mount body disposed against the insulating sheet 16 so as to be covered by the latter when the device is assembled. Although each of the two switches S carries three of the contact prongs 21, one of the contact sockets 23 for each of the switches is connected to a common terminal. Thus only five of the terminals 29 are required as indicated in Figs. 4 and 6. These terminals are fitted with clamping screws 33 by means of which the control circuit wires 10 are individually connected to the terminals.

To actuate the switches, resilient spring metal members 35 are mounted on the inside of the box B against the rear wall thereof. These members may be secured to the box as by rivets, one of which is indicated at 36, the spring members extending upwardly from the rivets and having at their upper ends projecting operating elements 37 which extend through openings 34 in the rear wall of the box. These openings are sufficiently large to permit free axial movement of the elements 37 when the latter are engaged by the cam rollers 5. Movement of the operating elements 37 under the influence of the cam rollers deflects the actuating members 35 from the full line position of Fig. 3 to a position such as that illustrated by the broken lines of the same figure. Such movement of the actuating members causes them to bear against axially slidable pins 38 carried in guide sleeves 39 supported by the insulating bodies 27 of the switches S. The pins 38 are spring loaded to return to their extended positions when the spring actuating members 35 are released by the cam rollers. The switch pins 38, when shifted axially in the manner described, function conventionally to operate the mechanisms of the switches S.

When it is desired to remove one of the switches S from the mount assembly, the cover 11 is removed from the box B and the mount body M withdrawn from the interior of the box. In this removal of the mount body the circuit wires 10 remain connected to the body terminals 29, there being no disturbance or interference with the electrical control circuit connections. Thus the possibility of making an incorrect switch connection in the control circuit is avoided and relatively unskilled personnel may service the switches. Either one or both of the switches S can be removed and replaced by a similar interchangeable switch merely by withdrawing the prongs 21 of the old switches from the body sockets 23, placing the contact prongs of the new switches in alignment with the correct contact sockets, and pressing the switches into place. In the operation of replacing or renewing one of the switches, the switch body 27 is disposed flatwise against the rib 20 which serves to locate the pins 21 in alignment with the sockets 23. The resilient grip of the spring contacts 26 on the prongs 21 serves not only to effect a positive electrical connection between the parts but also to secure the switch in position on the mount body M.

Although the invention has been described in connection with a mount body carrying two switches, it is apparent that a larger number of switches may be supported on a single mount body or, if desired, a mount body may be provided to support a single switch. Other types of switches may, of course, be employed, the sockets 23 being arranged in the mount body M to suit the locations of the contact prongs 21 supported in the bodies of the particular switches used.

In accordance with the patent statutes the principles of the present invention may be utilized in various ways, numerous modifications and alterations being contemplated, substitution of parts and changes in construction being resorted to as desired, it being understood that the article and combination shown in the drawings and described above are given merely for purposes of explanation and illustration without intending to limit the scope of the claims to the specific details disclosed.

What we claim and desire to secure by Letters Patent of the United States is:

1. In combination with an electrical wiring box having a plurality of relatively fixed walls and a removable cover, conduit means connected to the box, a plurality of electrical wires having terminal ends extending into the interior of the box through the conduit means, an insulating body carried by the cover and removable therewith, a plurality of electrical terminals carried by the insulating body, the terminal ends of said electrical wires being connected to the terminals, a plurality of electrical contacts carried by the body and connected to the terminals, and a switch mounted on the insulating body and removable therewith from the box as a unit, said switch including contacts connected to the contacts on the insulating body and having a movable element for operating the switch, said movable element projecting within the box toward a predetermined location adjacent a fixed wall thereof for engagement by a switch actuator, and said switch being readily removable from and replaceable on the insulating body when the cover and the insulating body are removed as a unit from the box.

2. In combination in an electrical control circuit, a wiring box, a removable cover on the box, an insulating body secured on the inside of the cover, said body having substantially coplanar switch mounting surfaces and an integral upstanding rib separating such surfaces, switches disposed against the mounting surfaces on opposite sides of the rib, and slidingly interfitted contact sockets and prongs carried by the insulating body and the switches for mounting the switches on the body and for establishing electrical connection therebetween, each switch being supported within the wiring box solely by the insulating body and having a side face contacting the separating rib for sliding movement thereagainst in a direction normal to one of the mounting surfaces in locating the switch in mounting the latter on the insulating body.

3. In combination, a wiring box having a plurality of relatively fixed walls defining an open side, a number of flexible electrical wires having terminal ends extending into the interior of the box, a cover for said open side of the box and means mounting the cover on the box for facile removal and replacement, an insulating body carried on the inner side of the cover for removal and replacement therewith, a plurality of electrical terminals carried by the insulating body, said terminal ends of the electrical wires being connected to said terminals, contact means carried by the insulating body and electrically connected to the terminals, a switch and means mounting the switch on the insulating body for facile removal and replacement relative to such body when exposed by removal of said cover, the switch being supported within the wiring box solely by the insulating body and including means automatically making predetermined electrical connection with said contact means upon mounting of the switch on the insulating body, and a movable element carried by the switch for operating the same, said movable element projecting within the box toward a predetermined location adjacent a fixed wall thereof for engagement by a switch actuator.

4. In combination, a wiring box having a plurality of relatively fixed walls defining an open side, a number of flexible electrical wires having terminal ends extending into the interior of the box, a cover for said open side of the box and means mounting the cover on the box for facile removal and replacement, an insulating body secured to the cover and wholly supported thereby, the insulating body being disposed within the wiring box when the cover is on the box, a plurality of electrical terminals carried by the insulating body, the electrical wires being connected to said terminals, contact means carried by the insulating body and electrically connected to the terminals, and a switch and means mounting the switch on the insulating body for facile removal and replacement relative to such body when exposed by removal of said cover, the switch being supported within the wiring box solely by the insulating body and including means automatically making predetermined electrical connection with said contact means upon mounting of the switch on the insulating body, and a movable element carried by the switch for operating the same, said movable element projecting within the box toward a predetermined location adjacent a fixed wall thereof for engagement by a switch actuator.

5. For use in combination in an electrical control circuit, a wiring box having a plurality of relatively fixed walls and an open side, a cover and means mounting the cover over the open side of the box for facile removal and replacement, an insulating body carried by the cover on the inner side thereof, electrical connection terminals on the body, a switch, separable interfitting contacts on the switch and on the insulating body for mounting the switch on such body for facile removal and replacement, the switch being supported solely by the insulating body, the contacts on the body being electrically connected to the terminals whereby electrical wires connected to the terminals remain so connected during removal and replacement of the cover and also during mounting and demounting of the switch, and a movable element carried by the switch for operating the same, said movable element projecting within the box toward a predetermined location adjacent a fixed wall thereof for engagement by a switch actuator.

6. For use in combination in an electrical control circuit, a wiring box having a plurality of relatively fixed walls and an open side, a cover and means mounting the cover over the open side of the box for facile removal and replacement, an insulating body supported on the inside of the cover and disposed within the box when the cover is mounted, a switch, separable interfitting contacts on the switch and on the insulating body for demountably supporting the switch on the body to position the switch within the box when the cover is mounted, the switch being supported solely by the insulating body, and electrical connection terminals on the body connected electrically to the contacts on the body whereby the contacts automatically make predetermined connection of the switch to the terminals upon mounting of the switch on the insulating body, a switch actuator mounted in a fixed location adjacent one of said walls of said box, and a movable element carried by the switch for operating the same, said movable element projecting within the box to a point adjacent said actuator for actuation thereby when said cover is mounted over the open side of the box.

7. In combination in an electrical control circuit, a wiring box having a plurality of relatively fixed walls and an open side, a cover and means securing the cover over the open side of the box for facile removal and replacement, an insulating body carried by the cover on the inner side thereof, electrical terminals on the insulating body, a switch carried solely by the insulating body and mounted thereon for facile removal and replacement when exposed by removal of said cover, separable pairs of interfitting contacts carried by the switch and by the insulating body, the body contacts being connected to the terminals whereby the contacts automatically make predetermined connection of the switch to the terminals upon replacement of the switch on the insulating body, and actuating means mounted interiorly of the wiring box on a fixed wall thereof, said actuating means being engageable with the switch to actuate the latter.

8. In combination in an electrical control circuit, a wiring box having an opening in one side, a movable actuator mounted interiorly of the box on the side opposite the opening, a cover and means for mounting the cover on the box over the opening for facile removal and replacement, an insulating body carried by the cover, the insulating body having a locating face directed toward said opposite side of the box when the cover is mounted, a switch disposed within the box and carried by the insulating body for facile removal and replacement when exposed by removal of said cover, the switch being disposed against said locating face, and means for connecting electrical wires to the switch including separable contacts carried by the switch and by the insulating body arranged automatically to make predetermined electrical connection upon mounting of the switch upon the insulating body and automatically to interrupt the electrical connection upon demounting of the switch, the switch including an element engageable by the actuator for operating the switch.

9. In combination with an electrical wiring box having a plurality of relatively fixed walls and a removable cover, an insulating body secured to the inner side of the cover for movement therewith, a plurality of electrical terminals carried by the insulating body, a switch, sliding electrical contact elements carried by the switch and by the insulating body for mounting the switch on the insulating body for facile removal therefrom, said switch being wholly supported inside the box by the insulating body for movement therewith from the box, conductors connecting the contact elements carried by the insulating body to the terminals carried thereby, the switch having a movable element for operating the same, said movable element projecting within the box toward a predetermined location adjacent a fixed wall thereof for engagement by a switch actuator, and the switch being readily removable from and replaceable on the insulating body when the cover is moved to expose the switch and the insulating body.

10. In combination with an electrical wiring box having a plurality of relatively fixed walls and a removable cover, a switch located within the box, said switch being mounted on and wholly supported by the cover for removal therewith, terminal means carried by the cover for attachment of electrical wires of a control circuit, means electrically connecting said terminal means to the switch whereby the switch remains connected to such a control circuit during removal of the cover and the switch from the wiring box, said switch having a projecting element actuatable for operating the switch, an actuating member mounted in the box for actuating said projecting element, said actuating member being supported by the box independently of the cover, and an element connected to the actuating member and projecting from the box for engagement externally of the box to move the actuating member against the switch element and operate the switch.

11. A switch mounting assembly comprising an electrical wiring box having an open side, a cover mounted across the open side of the wiring box for facile removal and replacement, an insulating body secured to the cover for movement therewith, said insulating body having a switch receiving surface, a plurality of contacts embedded in the body and exposed through said surface, an insulating member carried by the body in rigid relation, said member having a guide surface substantially normal to the switch receiving surface, and a switch mounted on the body for facile removal and replacement, said switch having a side face received in contacting relation against the guide surface, said switch having contact elements interfitted with the body contacts in the establishment of a plurality of electrical connections between the body contacts and the switch elements and in the provision of a mechanical connection for supporting the switch on the body, the switch being supported solely by the insulating body, the guide surface of the insulating member serving by sliding contact with the switch to locate the latter in mounting the switch on the body and by engagement with the mounted switch to resist shifting of the switch relative to the body thereby relieving the electrical connections of stresses imposed on the assembly by lateral forces applied to the switch.

12. In combination, an electrical wiring box having a plurality of relatively fixed walls and an open side, a separable cover for said open side of the box, an insulating body mounted within the box on the inner side of the cover for movement therewith, a plurality of electrical terminals mounted on the insulating body, a switch having a corresponding plurality of electrical contacts, quickly detachable means for releasably mounting said switch within the box on said insulating body and for electrically connecting said contacts to said terminals, respectively, the switch having a movable element for operating the same, said movable element projecting within the box toward a predetermined location adjacent a fixed wall thereof for engagement by a switch actuator, and cover mounting means for securing the cover in a predetermined position over the open side of the box to position the switch within the box, said cover mounting means being releasable to permit movement of the cover to expose the switch for facile removal and replacement.

WILLIAM R. CHANDLER.
ERNEST KOERNER.

REFERENCES CITED

The following references are of record in the file of this patent:

UNITED STATES PATENTS

| Number | Name | Date |
| --- | --- | --- |
| 1,938,309 | Williams | Dec. 5, 1933 |
| 1,949,806 | Miller | Mar. 6, 1934 |
| 2,063,200 | Smith | Dec. 8, 1936 |
| 2,331,997 | Mensenkamp | Oct. 19, 1943 |
| 2,397,688 | Osinski | Apr. 2, 1946 |
| 2,423,938 | Johansson | July 15, 1947 |
| 2,431,747 | Fry | Dec. 2, 1947 |